(12) United States Patent
Chandra et al.

(10) Patent No.: US 7,599,340 B2
(45) Date of Patent: Oct. 6, 2009

(54) METHOD AND APPARATUS OR ELIMINATING INTERFERENCE CAUSED BY HIDDEN NODES

(75) Inventors: Arty Chandra, Manhasset Hills, NY (US); Sudheer A. Grandhi, Mamaroneck, NY (US); Eldad M. Zeira, Huntington, NY (US); Joseph S. Levy, Merrick, NY (US); Sintayehu Dehnie, Harrison, NJ (US); Mohammed Sammour, Ville St. Laurent (CA)

(73) Assignee: InterDigital Technology Corporation, Wilmington, DE (US)

( * ) Notice: Subject to any disclaimer, the term of this patent is extended or adjusted under 35 U.S.C. 154(b) by 291 days.

(21) Appl. No.: 11/236,895

(22) Filed: Sep. 28, 2005

(65) Prior Publication Data

US 2006/0165036 A1 Jul. 27, 2006

Related U.S. Application Data

(60) Provisional application No. 60/646,794, filed on Jan. 25, 2005.

(51) Int. Cl.
*H04W 4/00* (2006.01)
*H04L 12/26* (2006.01)
(52) U.S. Cl. ...................................... 370/338; 370/236
(58) Field of Classification Search ................. 370/330, 370/462, 231, 236, 338, 401; 455/41.2
See application file for complete search history.

(56) References Cited

U.S. PATENT DOCUMENTS 5,661,727 A 8/1997 Kermani et al.

| | | | |
|---|---|---|---|
| 7,305,004 B2 * | 12/2007 | Sherman | 370/462 |
| 2002/0159411 A1 * | 10/2002 | Airy et al. | 370/330 |
| 2004/0042421 A1 * | 3/2004 | Mahany | 370/320 |
| 2004/0193886 A1 * | 9/2004 | Goldman | 713/176 |
| 2005/0041622 A1 * | 2/2005 | Dubuc et al. | 370/332 |
| 2005/0215197 A1 * | 9/2005 | Chen et al. | 455/41.2 |
| 2005/0250511 A1 * | 11/2005 | Xiao et al. | 455/453 |

FOREIGN PATENT DOCUMENTS

| | | |
|---|---|---|
| JP | 2004-289839 | 10/2004 |
| WO | 04/053940 | 6/2004 |

\* cited by examiner

*Primary Examiner*—George Eng
*Assistant Examiner*—Michael Faragalla
(74) *Attorney, Agent, or Firm*—Volpe and Koenig, P.C.

(57) ABSTRACT

A method and system for eliminating interference caused by hidden nodes is disclosed. An initiator control message is defined for an initiator, (typically a wireless station (STA)), in order to begin an aggregate frame exchange with at least one responder. The initiator control message includes information on the queue sizes at the initiator. A responder, (typically an access point (AP)), sets up the required protection for the transmission of data by the initiator based on information on the queue sizes indicated in a field of the initiator control message using a responder control message. Other STAs that receive the responder control message set parameters for a wireless medium access accordingly. In another embodiment, multiple receiver aggregate multi-poll (MMP) and power save aggregation descriptor (PSAD) control frames are configured for transmission by a non-AP STA to provide enhanced scheduling and mitigate hidden node problems.

10 Claims, 5 Drawing Sheets

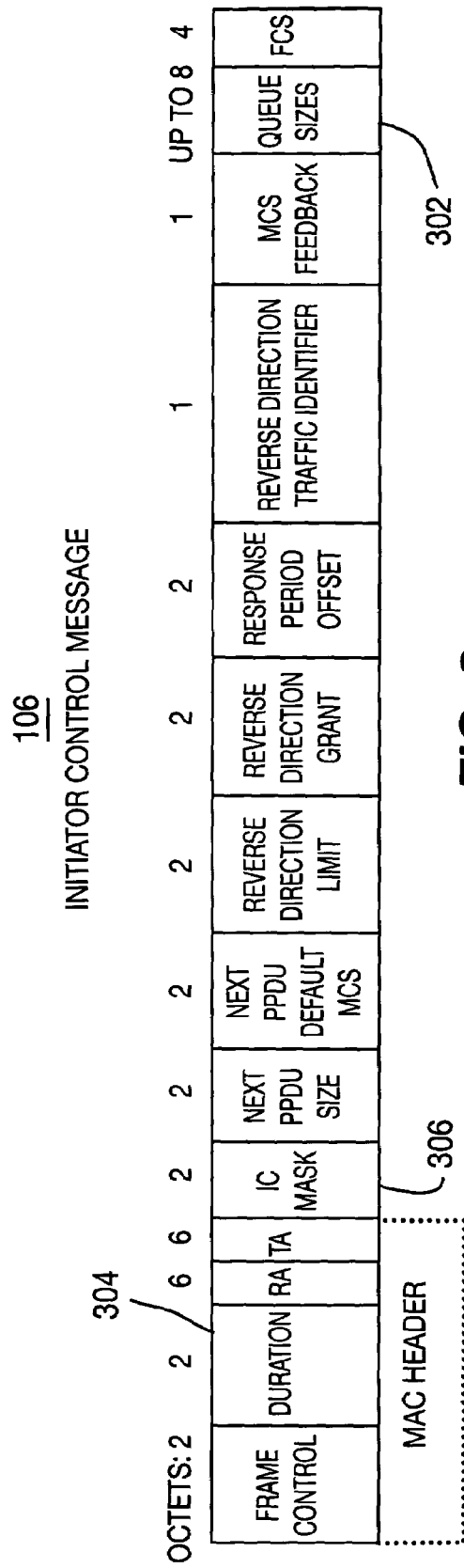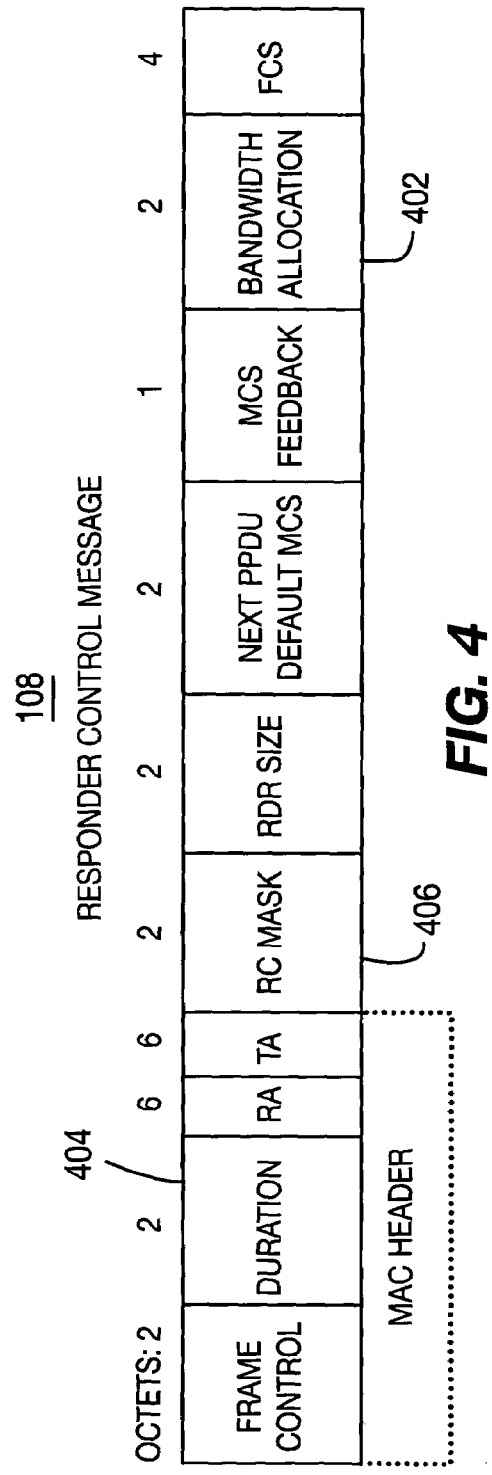

METHOD AND APPARATUS OR ELIMINATING INTERFERENCE CAUSED BY HIDDEN NODES

CROSS REFERENCE TO RELATED APPLICATION

This application claims the benefit of U.S. provisional application No. 60/646,794 filed Jan. 25, 2005, which is incorporated by reference as if fully set forth.

FIELD OF INVENTION

The present invention relates to wireless communication systems. More particularly, the present invention relates to a method and system for eliminating interference caused by hidden nodes.

BACKGROUND

A wireless communication system, such as a wireless local area network (WLAN), can achieve high throughput by means of aggregation. Aggregation refers to the process of grouping several medium access control (MAC) protocol data units (MPDUs) for transmission in a single frame by a wireless station (STA). The aggregation enables a reduction of overheads due to headers of the MPDUs and inter-frame spacing (IFS) between data transmissions. Moreover, aggregation of MPDUs with different rates has an advantage of reducing overhead due to preambles. Typically aggregation is an optional feature and is triggered under traffic conditions where it may provide efficiency and high throughput in data transfer.

Frame aggregation that allows aggregation of multiple data and control MPDUs in one physical layer convergence procedure (PLCP) protocol data unit (PPDU) is known in prior art. The prior art also includes control of MPDUs and frame exchange rules for the exchange of aggregate frames between a single initiating STA and potentially multiple responding STAs. Protection of frame exchange sequences are provided using one of two mechanisms: a MAC-level mechanism using network allocation vector (NAV) settings, and a physical layer (PHY)-level mechanism based on appropriately setting the legacy PLCP rate/length information, which is known as spoofing.

An initial packet from an initiator for an aggregate packet exchange is an initiator aggregate control (IAC) packet and the response to the IAC packet from the responder is a responder aggregate control (RAC) packet. The initiator does not provide information regarding a queue size of its transmitter in its initial IAC packet so that the responder in its response packet can set the required protection for the transmission by either NAV setting or spoofing. The queue size information from the initiator comes only in its second packet transmission.

Multiple receiver aggregate multi-poll (MMP) and power save aggregation descriptor (PSAD) control frames were introduced to implement power saving and scheduling of the channel for multiple transmission opportunities (TXOPs). The MMP/PSAD frames are used to define multiple response periods, in combination with multiple receiver aggregation.

While the conventional wireless communication systems mitigate the hidden node problem to a large extent, total hidden node elimination is not provided.

SUMMARY

The present invention is related to a method and system for eliminating interference caused by hidden nodes is disclosed. The present invention defines an initiator control message for an initiator, (typically a STA), in order to begin an aggregate frame exchange at least one responder. The initiator control message includes information on the queue sizes at the initiator. A responder, (typically an access point (AP)), sets up the required protection for the transmission of data by the initiator based on information on the queue sizes indicated by a field in the initiator control message using a responder control message. Other STAs that receive the responder control message set parameters for a wireless medium access in accordance with the responder control message. In addition, bandwidth allocation information is included in a field of the responder control message to assist in resource management for data transmission at the initiator.

In another embodiment, interference caused by hidden nodes may also be mitigated in MMP/PSAD frame exchange sequences. The present invention provides a method for transmitting the MMP/PSAD control frame from a non-AP STA. Since the MMP sequence is protected using NAV and extended PHY protection (EPP), the MMP sequence is used to schedule multiple TXOPs.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 3 shows an initiator control MPDU in accordance with the present invention;

FIG. 4 shows a responder control MPDU in accordance with the present invention;

DETAILED DESCRIPTION OF THE PREFERRED EMBODIMENTS

Hereafter, the terminology "STA" includes but is not limited to a wireless transmit/receive unit (WTRU), a user equipment, a mobile station, a fixed or mobile subscriber unit, a pager, or any other type of device capable of operating in a wireless environment. When referred to hereafter, the terminology "AP" includes but is not limited to a base station, a Node-B, a site controller or any other type of interfacing device in a wireless environment.

The features of the present invention may be incorporated into an integrated circuit or be configured in a circuit comprising a multitude of interconnecting components.

The present invention provides a method for use in a wireless communication system, such as a WLAN, to support aggregate frame exchanges between an initiator and one or more responders using an initiator control message and a responder control message, which provide protection from all other STAs including hidden nodes. Although the present invention will be explained with reference to aggregate frame exchanges, the present invention is applicable to any type of frame exchange between an initiator and one or more responders, and is not limited to aggregate frame exchanges.

Figure 1:
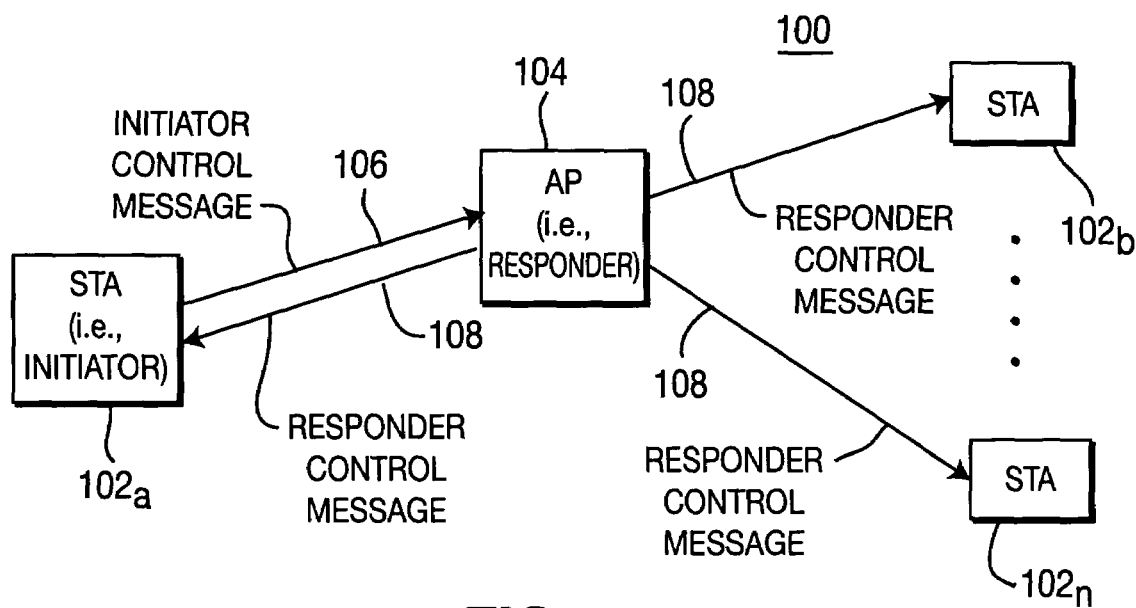
FIG. 1 is a block diagram of a wireless communication system in which the present invention is implemented.

FIG. 1 is a block diagram of a wireless communication system 100, such as a WLAN, in which the present invention is implemented. The present invention will be explained with reference to the infrastructure WLAN hereinafter. However, it should be noted that the present invention is applicable to an Ad hoc network, a mesh network, or any other type of wireless communication system.

The system 100 includes a plurality of STAs 102a, 102b, . . . , 102n and at least one AP 104. As an example, the STA 102a intends to transfer data, and thus the STA 102a will be referred as "initiator" hereinafter. Typically, but not necessarily, an initiator 102a is not an AP, (nor a STA functioning as an AP), and may not be heard by all of the STAs in the coverage area. Therefore, the transmission of the initiator 102a can result in a collision with transmissions by the other STAs 102b-102n, which is hidden from the initiator 102a. In an infrastructure network, the AP 104 controls transmission of the STAs 102a-102n in the coverage area and will be referred to as "responder" hereinafter. In an Ad hoc network, any STA 102a-102n can be an initiator or a responder. The responder can be heard by all of the STAs 102a-102n in the coverage area.

Figure 2:
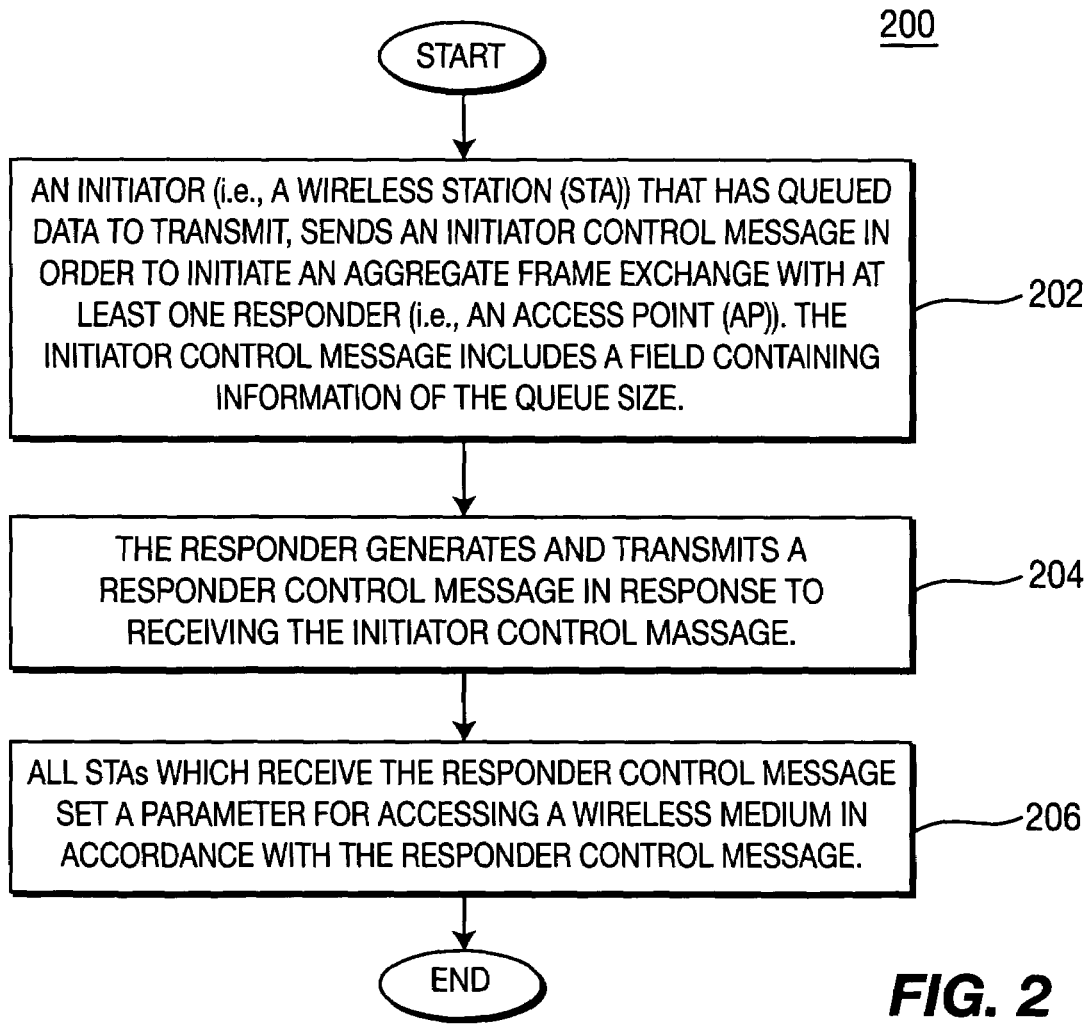
FIG. 2 is a flow diagram of a process for eliminating interference caused by hidden nodes in accordance with the present invention.

FIG. 2 is a flow diagram of a process 200 including method steps for eliminating interference caused by hidden nodes in accordance with the present invention. In step 202, an initiator 102a that has queued data to transmit, sends an initiator control message, (i.e., packet), 106 to the AP 104 to initiate transmission between the STAs 102a-102n and/or the AP 104 of the wireless communication system 100 of FIG. 1. The initiator control message 106 may be sent to begin an aggregate exchange with one or more responders. An aggregate MPDU is a packet aggregated with a plurality of MAC service data units (MSDUs) destined to one or more receivers. Control and/or data MPDUs may be aggregated.

Referring to FIG. 3, the initiator control message 106 includes a field 302 containing information on the queue size.

The queue size field 302 may include information of multiple queues for multiple applications. For example, the initiator 102a may run four applications simultaneously and may have four queues for the four applications. In such a case, the queue size field 302 may have information for all of the four queue sizes. The initiator control message 106 also provides information for control of at least one of a modulation and coding scheme (MCS), a size, duration, training, and any reverse flow of aggregates in an exchange of aggregates between STAs or APs.

Referring to FIG. 2, in step 204, a responder 104 generates and transmits a responder control message 108 in response to the initiator control message 106. The purpose of the responder control message 108 is to set an appropriate protection for transmission of an aggregate frame exchange. The responder 104 sets up the required protection for the transmission of data by the initiator 102a based on information on the queue size.

The responder control message 108 may further include a bandwidth allocation field containing information on bandwidth allocation corresponding to the queue sizes in the initiator control message 106. The information on bandwidth allocation facilitates resource management at the initiator 102a.

Referring to FIG. 2, in step 206, all of the STAs 102b-102n in the coverage area that received the responder control message 108 set a parameter for accessing a wireless medium in accordance with the information included in the responder control message 108. For example, the STAs 102b-102n set a network allocation vector (NAV) for the duration set for transmission of the aggregate packets. Alternatively, single-ended spoofing or pair-wise spoofing may be used. The spoofing is a physical layer protection of a frame exchange that places STAs into a receiving mode for the spoofed duration.

The initiator control message 106 should be small in size so as to minimize the possibility of collision. The responder control message 108 should also be small in size so that the responder control message 108 can be efficiently transmitted at a low rate enough to be successfully received by all STAs in the coverage and thereby update their NAV setting or spoofing.

FIG. 3 shows an exemplary initiator control message 106 in accordance with the present invention. The initiator control message 106 shown in FIG. 3 is provided as an example, not as a limitation, and more or less fields or information elements and different size may be utilized. As stated above, a queue size field 302 is included in the initiator control message 106 to provide information of the queue size at the initiator. The initiator control message 106 may set the NAV by setting the duration field 304 in its MAC header, (i.e., MAC level protection), which is read by all of the STAs 102 monitoring the channel which may, in turn, set their own NAV. Spoofing is achieved by setting the packet length and data rate fields in the PHY header appropriately, (i.e., spoofed or protection duration=packet length/data rate), which will place the STAs 102 in a receiving mode for the spoofed duration.

The fields of the initiator control message 106 are described in Table 1.

TABLE 1

| Field | Size (bytes) | Purpose |
| --- | --- | --- |
| Frame Control | 2 | Type is control, subtype is initiator control (IC) |

TABLE 1-continued

| Field | Size (bytes) | Purpose |
|---|---|---|
| Duration | 2 | |
| Receiver Address (RA) | 6 | |
| Transmitter Address (TA) | 6 | |
| IC Mask | 2 | A bitmask indicating which IC elements are present in the message. |
| Next PPDU Size | 2 | Size in bytes of following PPDU that will be sent by the initiator. This is interpreted along with the Next PPDU default MCS to determine the duration of the next PPDU. Present when FPD in the IC Mask is indicated, otherwise undefined. |
| Next PPDU Default MCS | 2 | Default MCS that will be used in the absence of any updated training information to send next PPDU. Present when FPD in the IC Mask is indicated, otherwise undefined. |
| Reverse direction limit (RDL) | 2 | Indicates the amount of time in microseconds that is the maximum amount of time that will be granted in a RDG. Present when RDL in the IC Mask is indicated, otherwise undefined. |
| Reverse direction grant (RDG) | 2 | Indicates the amount of time in microseconds that is available for a reverse direction PPDU including any expected response MPDUs and a responder control (RC) MPDU. Present when RDG in the IC Mask is indicated, otherwise undefined. |
| Response Period Offset (RPO) | 2 | Indicates the delay in microseconds between the end of the PPDU containing the IC MPDU and the start of the response PPDU. This value shall be no less than SIFS. Present when RDG in the IC Mask is indicated, otherwise undefined. |
| Reverse Direction Traffic Identifier (RDTID) | 1 | Indicates one of: 1) An AC for which reverse direction grant is valid A TSID indicating a specific TS for which the reverse direction grant is valid 2) Unconstrained 3) Present when RDG is indicated, otherwise undefined. |
| MCS Feedback | 1 | Contains a recommended MCS value. Present when MFB in the IC Mask is indicated, otherwise undefined. |
| Queue Sizes | Up to 8 | Allows specification of up to 4 queue sizes corresponding to 4 applications (2 bytes for each queue size) |
| FCS | 4 | |

FIG. 4 shows an exemplary responder control message 108 in accordance with the present invention. As stated above, the responder control message 108 includes a field 402 containing bandwidth allocation information corresponding to the queue sizes indicated in field 302 of the initiator control message 106. The responder control message 108 may set protection time based on the queue size by setting a duration field 404 in its MAC header, (i.e., MAC level protection), and/or by setting appropriately the packet length and data rate fields in its PHY header, (i.e., PHY level protection).

The fields of the responder control message 108 are described in Table 2.

TABLE 2

| Field | Size (bytes) | Purpose |
|---|---|---|
| Frame Control | 2 | Type is control, subtype is responder control (RC) |

TABLE 2-continued

| Field | Size (bytes) | Purpose |
|---|---|---|
| Duration | 2 | |
| RA | 6 | |
| TA | 6 | |
| RC Mask | 2 | A bitmask indicating which RC elements are present in the message. |
| RDR Size | 2 | Size in bytes of requested reverse direction flow. This is interpreted along with the Next PPDU default MCS to determine the duration of the next PPDU. Present when RDR in the RC Mask is indicated, otherwise undefined. |
| Next PPDU Default MCS | 2 | Default MCS that will be used in the absence of any updated training information to send next PPDU. Present when RDR in the RC Mask is indicated, otherwise undefined. |
| MCS Feedback | 1 | Contains a recommended MCS value. Present when MFB in the RC Mask is indicated, otherwise undefined. |
| Bandwidth Allocation | 2 | Contains bandwidth allocation information in response to the Queue Sizes in the IC MPDU |
| FCS | 4 | |

When the bandwidth allocation can be made only at a later time, (not at the time the responder control message 108 is sent), the responder control message 108 may be a simple positive acknowledgement (ACK) message. Alternatively, the responder control message 108 may include a special reserved number in the bandwidth allocation field 402 to indicate that the bandwidth allocation will be made later.

The initiator control message 106 may be a packet dedicated for the purpose of sending the transmitter queue sizes, and the responder control message 108 may also be a packet dedicated for the purpose of sending the bandwidth allocation information. The advantage of using the dedicated packets is that they can be used independently.

The initiator control message 106 includes an IC mask field 306 which is a bitmask indicating which elements are present in the initiator control message 106. The IC mask field 306 preferably comprises two bytes and the description of each bit position of the IC mask field 306 is shown in Table 3. It should be noted that the IC mask field 306 shown in FIG. 3 is provided as an example and more or less elements may be implemented and any variances are possible.

TABLE 3

| IC Mask Field bit | Position | Description |
|---|---|---|
| RTS | B0 | When set, indicates this is a request-to-send (RTS). The receiver should not generate any response if its NAV is non-zero. |
| TRQ | B1 | When set, indicates a request to train the channel. Used for multiple-input multiple-output (MIMO) with implicit feedback. |
| MRQ | B2 | When set, indicates a request for MCS feedback. |
| MFB | B3 | When set, indicates an MFB training response is present as defined by the MCS Feedback field. |
| FPD | B4 | When set, indicates that the next PPDU duration may be determined from the next PPDU length and default MCS fields. FPD is set only when using Pairwise Spoofing rules. |
| RDG | B5 | When set, indicates a reverse direction grant is present. |
| RDL | B6 | When set, indicates that a reverse direction limit is present |

TABLE 3-continued

| IC Mask Field bit | Position | Description |
| --- | --- | --- |
| Queue Size1 | B7 | When set, indicates that Queue Size 1 is present |
| Queue Size2 | B8 | When set, indicates that Queue Size 2 is present |
| Queue Size3 | B9 | When set, indicates that Queue Size 3 is present |
| Queue Size4 | B10 | When set, indicates that Queue Size 4 is present |

The responder control message 108 includes an RC Mask field 406 which is a bitmask indicating which logical elements are carried in the responder control message 108. The RC Mask field 406 preferably comprises two bytes and the description of each bit position of the RC Mask field 406 is shown in Table 4. It should be noted that the RC mask field 406 in FIG. 4 is provided as an example and more or less elements may be implemented and any variances are possible.

TABLE 4

| RC Mask Field bit | Position | Description |
| --- | --- | --- |
| CTS | B0 | When set, indicates this is a clear-to-send (CTS). |
| TRQ | B1 | When set, indicates a request to train the channel. Used for MIMO with implicit Feedback. |
| MRQ | B2 | When set, indicates a request for MCS feedback. |
| MFB | B3 | When set, indicates an MFB training response is present as defined by the MCS Feedback field. |
| RDR | B4 | When set, indicates a request for reverse direction dataflow is present as described by the RDR Size and Next PPDU Default MCS fields. |
| Bandwidth Allocation | B5 | When set, indicates a bandwidth allocation information field is present in response to the Queue Sizes in the IC MPDU |

In another embodiment, MMP/PSAD is implemented to mitigate problems caused by hidden nodes. In conventional wireless communication systems, an MMP control frame may only be transmitted from an AP, whereas a PSAD control frame may be transmitted from any STA. In accordance with the present invention, the MMP and the PSAD control frames are modified such that non-AP STAs are able to transmit MMP/PSAD frame exchange sequences without collisions due to hidden nodes occurring. These sequences generally refer to the data frame sequences that follow the MMP/PSAD frame. An MMP/PSAD frame is a control frame that specifies that data will be transmitted to and from certain STAs at certain subsequent times.

Furthermore, an RTS/CTS mechanism may be used to reserve the medium for MMP/PSAD type TXOP scheduling for multiple STAs. However, the RTS/CTS mechanism involves the following sequence: RTS, SIFS, CTS, SIFS, MMP/PSAD. In accordance with the present invention, the following sequence is used: MMP/PSAD, SIFS, CTS/ACK. This sequence is more efficient in the sense that it involves one less frame and one less SIFS duration.

Figure 5:
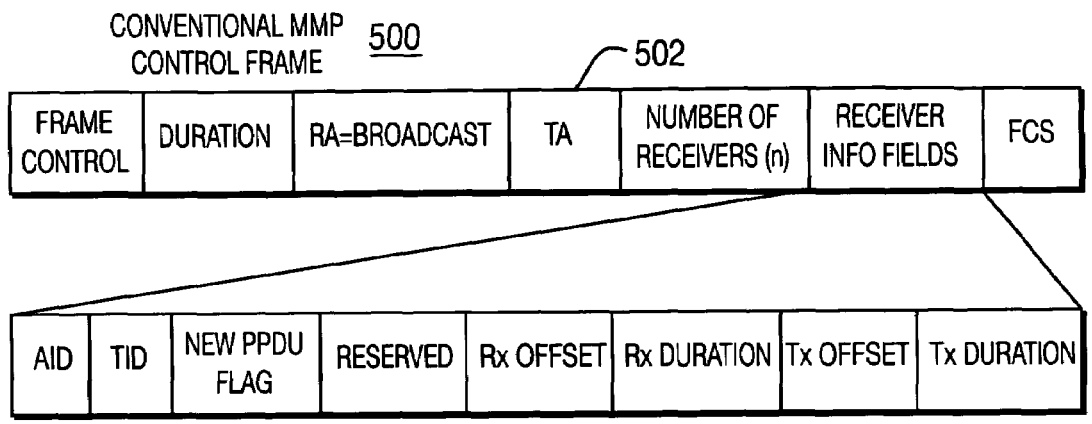
FIG. 5 shows a conventional MMP control frame format.
Figure 6:
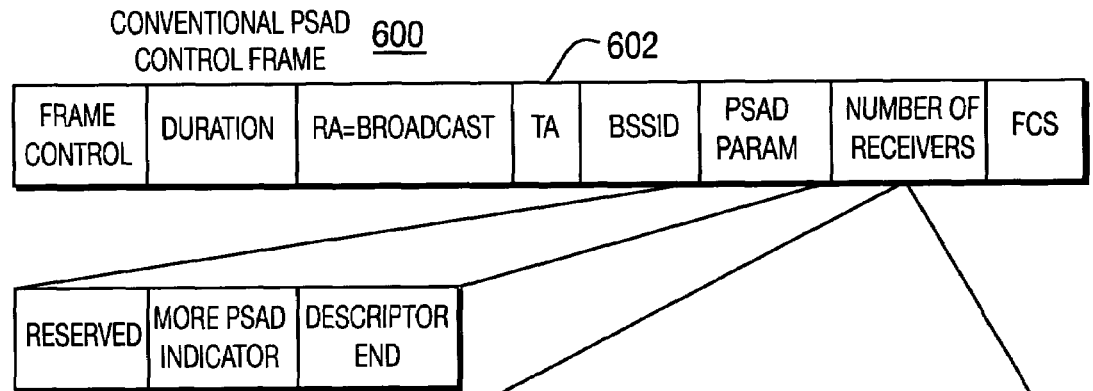
FIG. 6 shows a conventional PSAD control frame format.
Figure 7:
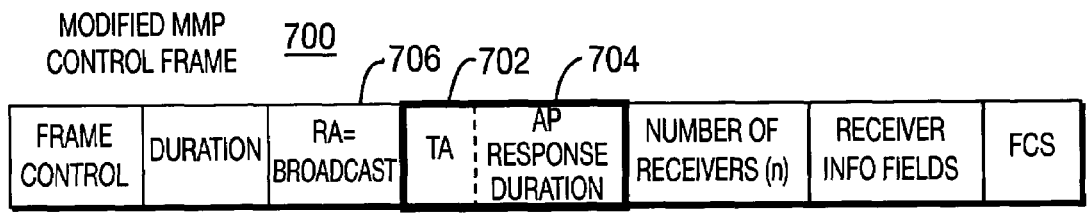
FIG. 7 shows a modified MMP control frame format in accordance with another embodiment of the present invention.
Figure 8:
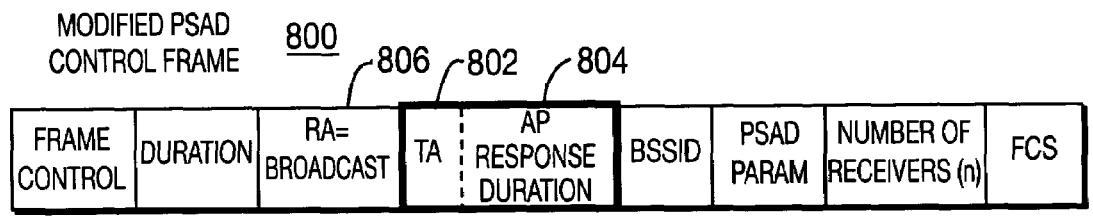
FIG. 8 shows a modified PSAD control frame format in accordance with another embodiment of the present invention.

FIG. 5 shows the format of a conventional MMP control frame 500. FIG. 6 shows the format of a conventional PSAD control frame 600. Since non-AP STAs are allowed to send the MMP, a transmitter field (TA) 502 in the conventional MMP control frame 500 is modified, as shown in FIG. 7, to include non-AP STAs by adding a new AP response duration field 704 to a TA field 702 in a modified MMP control frame 700. The AP response duration field 704 indicates the duration within which the AP ends its response transmission. Furthermore, a TA 602 in the conventional PSAD control frame 600 is modified, as shown in FIG. 8, to include non-AP STAs by adding a new AP response duration field 804 to a TA field 802 in a modified PSAD control frame 800.

In accordance with the present invention, a non-AP STA transmits the modified MMP and PSAD control frames 700, 800 to the AP and STAs that are within its range.

During the AP response duration 704, 804, the AP broadcasts its acknowledgment (ACK) of receiving the MMP/PSAD sequence from the non-AP STA in accordance with respective RA fields 706, 806 of the MMP and PSAD control frames 700, 800, whereby the RA fields 706, 806 are each set to broadcast. The purpose of broadcasting the ACK is to inform all of the other STAs in the vicinity of the AP of the medium reservation for the duration of the MMP schedule, and thus collisions due to hidden nodes are avoided. The ACK from the AP is used to set NAV or EPP for the entire duration of the MMP schedule. If the transmitting non-AP STA does not receive an ACK within the AP Response Duration, it waits for a period of time equal to a short inter-frame spacing (SIFS) before retransmitting the MMP/PSAD sequence.

The response from the AP to the MMP/PSAD from a non-AP STA can be any other frame or frames that fit within the AP response duration specified in the fields 704, 804. The AP response duration 704, 804 is set to 0 when the AP sends the MMP/PSAD sequence.

In another alternative embodiment, a MMP/PSAD Tx/uplink transmit (ULT) offset field is used instead of the AP response duration fields 704, 804 to achieve the same objective by reusing the Tx/ULT offset field. The conventional MMP/PSAD frames shown in FIGS. 5 and 6 already contains offset and duration fields, which specify the time offset at which a particular station shall respond, and the time duration that the response shall last for.

Furthermore, the conventional MMP control frame 500 and the conventional PSAD control frame 600 may be modified such that the AP is the only receiver. Even though it adds overhead, the AP duplicates the MMP/PSAD control frames 500, 600 and broadcasts it for the purpose of providing protection for the duration of the MMP/PSAD schedule. In the modified MMP/PSAD control frames shown in FIGS. 7 and 8, the RA=Broadcast field 706, 806 indicates that the transmitter of the MMP/PSAD frame is telling all receivers that they should interpret and act on the information that the MMP/PSAD frame contains. However, the transmitter will send the MMP/PSAD with an RA=AP address only, and when the AP receives it, it will duplicate the MMP/PSAD frame and broadcast it to all receivers.

FIGS. 9-14 show the MMP/PSAD frame, and the information it specifies.

Figure 9:
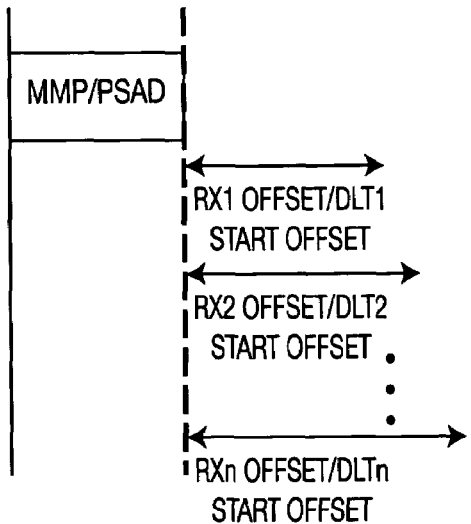
FIG. 9 shows conventional downlink allocations in an uplink (non-AP STA) MMP/PSAD frame exchange sequence.

FIG. 9 shows conventional downlink allocations in an uplink (non-AP STA) MMP/PSAD frame exchange sequence.

Figure 10:
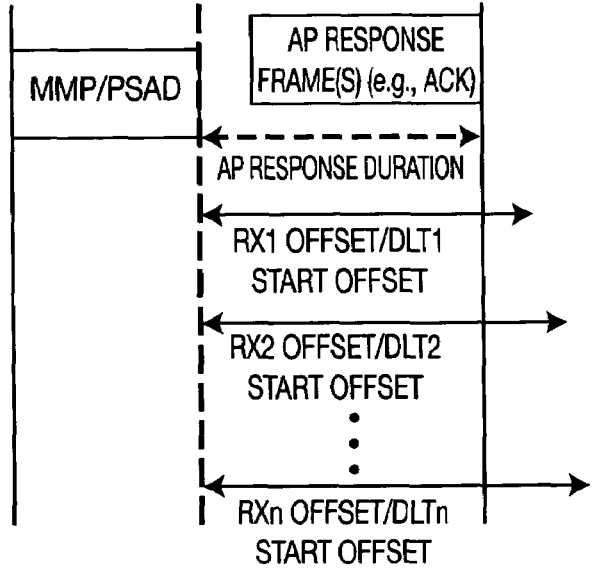
FIG. 10 shows uplink allocations in an uplink (non-AP STA) MMP/PSAD frame exchange sequence in a case of an AP responding with an ACK in accordance with another embodiment of the present invention.

FIG. 10 shows downlink allocations in an uplink (non-AP STA) MMP/PSAD frame exchange sequence including a Rx/downlink transmit (DLT) offset field is used in a case of an AP responding with an ACK in accordance with another embodiment of the present invention. FIG. 10 shows that following the MMP/PSAD frame, the AP response frame is transmitted first. The MMP/PSAD frame specifies the start offset at which the AP will transmit data to each station. There are also frames being transmitted starting at such start offsets. For example, the Rx1 offset/DLT1 start offset specifies the time at which data destined to a first STA will be transmitted, while the Rx2 offset/DLT2 start offset specifies the time at which data destined to a second STA will be transmitted. When the Rx2 offset time starts, data transmission to the first STA should be complete, (i.e., there should be no overlapping transmissions).

Figure 11:
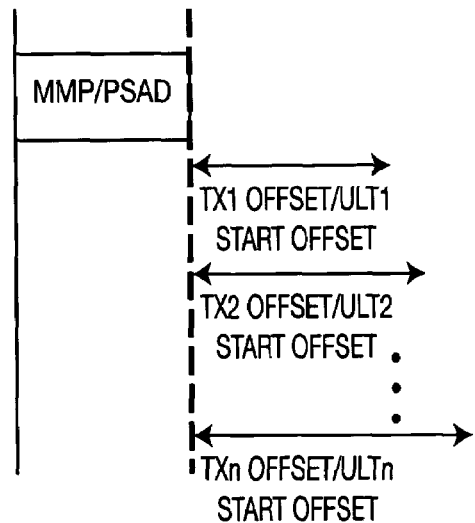
FIG. 11 shows conventional uplink allocations in an uplink (non-AP STA) MMP/PSAD frame exchange sequence.

FIG. 11 shows conventional uplink allocations in an uplink (non-AP STA) MMP/PSAD frame exchange sequence.

Figure 12:
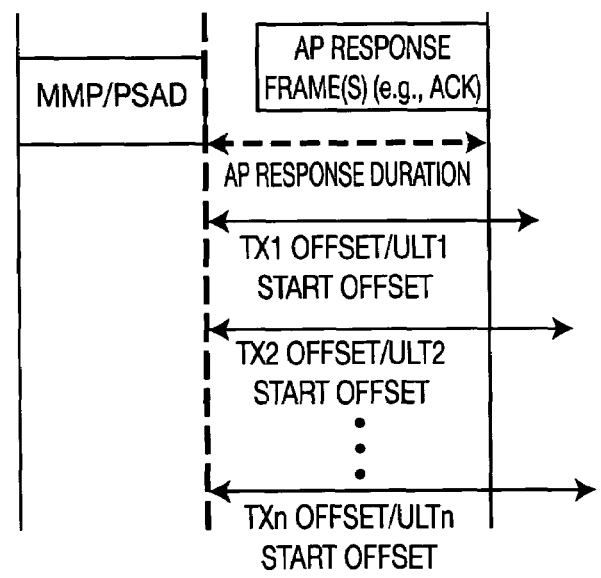
FIG. 12 shows uplink allocations in an uplink (non-AP STA) MMP/PSAD frame exchange sequence in a case of an AP responding with an ACK in accordance with another embodiment of the present invention.

FIG. 12 shows uplink allocations in an uplink (non-AP STA) MMP/PSAD frame exchange sequence in a case of an AP responding with an ACK in accordance with another embodiment of the present invention. The uplink MMP/PSAD may be used in a DLP-like transmission. Direct link protocol (DLP) or direct link setup (DLS) are features specified in the IEEE 802.11e standard. These features allow two non-AP stations to communicate directly with each other without having their data being relayed by the AP, (i.e., STA1→STA2 instead of STA1→AP→STA2). The TA and RA fields are set according to the STAs involved in DLP/DLS.

Figure 13:
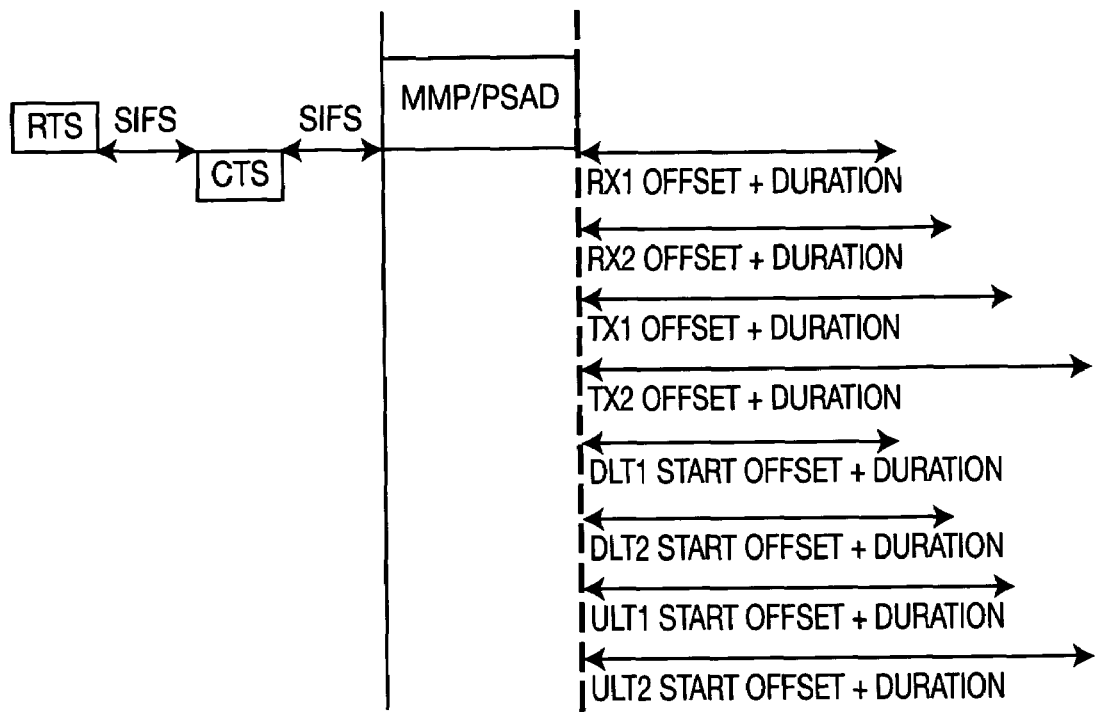
FIG. 13 shows a conventional MMP/PSAD downlink frame sequence.

FIG. 13 shows a conventional MMP/PSAD downlink frame sequence in a case of AP responding with CTS.

Figure 14:
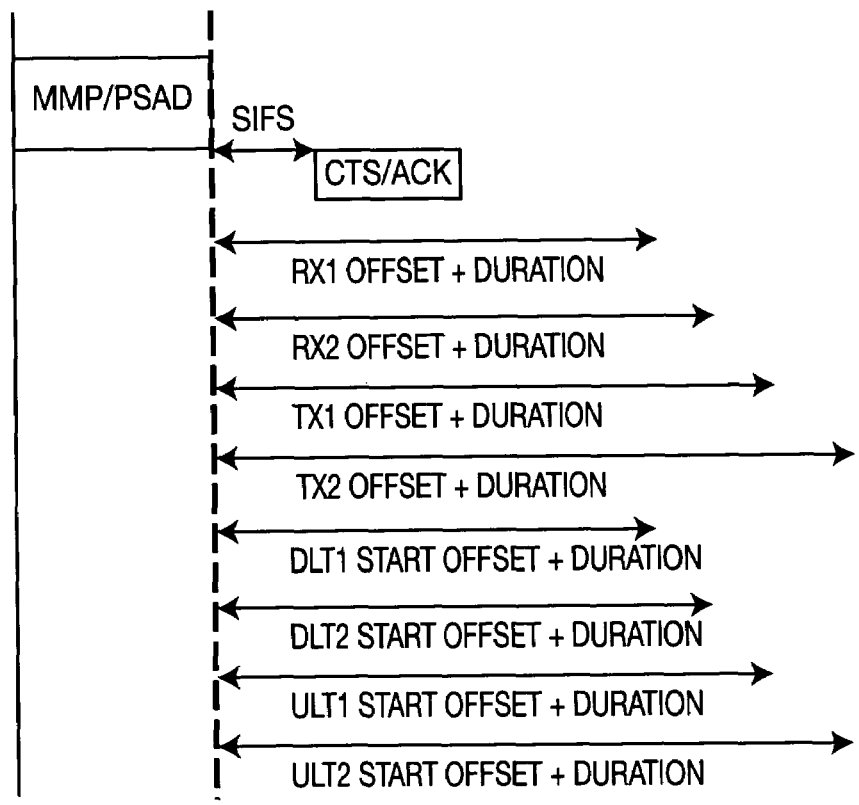
FIG. 14 shows an MMP/PSAD downlink frame sequence which includes RTS functionality in a case of an AP responding with a CTS in accordance with another embodiment of the present invention.

FIG. 14 shows an MMP/PSAD downlink frame sequence which includes RTS functionality in a case of an AP responding with a CTS in accordance with another embodiment of the present invention.

The frame exchange sequence in case of AP responding with CTS is shown in FIGS. 13 and 14.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless communication method of eliminating interference caused by hidden nodes, the method comprising:
   transmitting an initiator control message in order to initiate an exchange of aggregate medium access control (MAC) protocol data units (MPDUs), each MPDU being a packet aggregated with a plurality of MAC service data units (MSDUs), wherein the initiator control message includes a queue size field containing information on the size of at least one queue, information for control of a modulation and coding scheme (MCS) and any reverse flow of aggregate MPDUs in an exchange of aggregate MPDUs;
   receiving a responder control message including a bandwidth allocation field containing information on bandwidth allocation corresponding to the size of the at least one queue; and
   setting a parameter for accessing a wireless medium in accordance with the responder control message.

2. The method of claim 1 wherein the bandwidth allocation field is set to a specific value indicating that the responder control message does not carry bandwidth allocation information.

3. The method of claim 1 wherein a network allocation vector (NAV) is updated in accordance with the responder control message.

4. The method of claim 1 wherein spoofing is utilized to initiate a receiving mode for a spoofed duration in accordance with the responder control message.

5. The method of claim 4 wherein the spoofing is a pair-wise spoofing.

6. A wireless communication initiator for eliminating interference caused by hidden nodes, the initiator comprising:
   at least one queue having data queued for transmission;
   a transmitter configured to transmit an initiator control message in order to initiate an exchange of aggregate medium access control (MAC) protocol data units(MPDUs), each MPDU being a packet aggregated with a plurality of MAC service data units (MSDUs), wherein the initiator control message includes a queue size field containing information on the size of the at least one queue, information for control of a modulation and coding scheme (MCS) and any reverse flow of aggregate MPDUs in an exchange of aggregate MPDUs; and
   a receiver configured to receive a responder control message including a bandwidth allocation field containing information on bandwidth allocation corresponding to the size of the at least one queue, wherein a parameter for accessing a wireless medium is set in accordance with the responder control message.

7. The initiator of claim 6 wherein the bandwidth allocation field is set to a specific value indicating that the responder control message does not carry bandwidth allocation information.

8. The initiator of claim 6 wherein a network allocation vector (NAV) is updated in accordance with the responder control message.

9. The initiator of claim 6 wherein spoofing is utilized to initiate a receiving mode for a spoofed duration in accordance with the responder control message.

10. The initiator of claim 9 wherein the spoofing is a pair-wise spoofing.

* * * * *

UNITED STATES PATENT AND TRADEMARK OFFICE
CERTIFICATE OF CORRECTION

| | | |
|---|---|---|
| PATENT NO. | : 7,599,340 B2 | Page 1 of 1 |
| APPLICATION NO. | : 11/236895 | |
| DATED | : October 6, 2009 | |
| INVENTOR(S) | : Chandra et al. | |

It is certified that error appears in the above-identified patent and that said Letters Patent is hereby corrected as shown below:

ON THE TITLE PAGE

At Item (54), Title, page 1, left column, line 1, after the word "APPARATUS", delete "OR" and insert therefor --FOR--.

IN THE SPECIFICATION

At column 1, line 1, after the word "APPARATUS" delete "OR" and insert therefor --FOR--.

At column 2, line 11, after the word "exchange" insert --with--.

At column 3, line 42, after the word "referred", insert --to--.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,599,340 B2  Page 1 of 1
APPLICATION NO. : 11/236895
DATED : October 6, 2009
INVENTOR(S) : Chandra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this

Twenty-eighth Day of September, 2010

David J. Kappos
*Director of the United States Patent and Trademark Office*